United States Patent [19]

Franz et al.

[11] Patent Number: 4,583,374
[45] Date of Patent: Apr. 22, 1986

[54] TEMPERATURE AND LIQUID LEVEL CONTROL SYSTEM FOR FLUID CYCLES

[75] Inventors: Friedhelm Franz; Walter Nestler; Eberhard Wobst, all of Dresden; Christian Kluge, Freital; Egon Preussker; Günther Ulbrich, both of Dresden, all of German Democratic Rep.

[73] Assignee: VEB Kombinat Luft-und Kältetechnik, Dresden, German Democratic Rep.

[21] Appl. No.: 544,381

[22] Filed: Oct. 21, 1983

[51] Int. Cl.[4] .............................................. F25B 41/00
[52] U.S. Cl. ...................................... 62/210; 62/222; 251/30.01
[58] Field of Search .................. 62/210, 211, 212, 222, 62/223, 224, 225, DIG. 17, 204; 236/80 G, 80 R, 84; 251/30, 31, 65; 374/178

[56] References Cited

U.S. PATENT DOCUMENTS

| 1,095,935 | 5/1914 | Sheldon | 251/30 |
|---|---|---|---|
| 2,339,352 | 1/1944 | Ray | 251/30 |
| 2,432,859 | 12/1947 | Carter | 62/225 |
| 2,582,088 | 1/1952 | Walthers | 251/30 X |
| 3,420,104 | 1/1969 | Troemel et al. | 374/178 |
| 3,537,272 | 11/1970 | Hales et al. | 62/212 X |
| 4,112,703 | 9/1978 | Kountz | 62/211 |
| 4,159,026 | 6/1979 | Williamson | 251/65 X |
| 4,261,180 | 4/1981 | Nozawa et al. | 62/222 X |
| 4,307,576 | 12/1981 | Takano et al. | 62/204 |
| 4,459,819 | 7/1984 | Hargraves | 62/212 |

FOREIGN PATENT DOCUMENTS

253318 7/1964 Australia .................. 251/30

*Primary Examiner*—Harry Tanner
*Attorney, Agent, or Firm*—Horst M. Kasper

[57] ABSTRACT

A control apparatus and method is provided for controlling temperatures, temperature differences, or, respectively, liquid levels in refrigeration cycles used for example in heat pumps or refrigeration installations, which is not dependent on the refrigerating medium employed or on the field of application. The flow of the liquid is controlled by two position relay control valves which are electromagnetically actuated and operated by fluid pressure, are suited for large numbers of cycles and are wear resistant. Instabilities in the refrigeration medium cycle are avoided and variations in the end point of the evaporation no longer have a negative influence on the functioning of the control system. The conventionally employed thermostatic expansion valves are replaced by wear resistant two position valves with high frequencies of switching.

31 Claims, 4 Drawing Figures

TEMPERATURE AND LIQUID LEVEL CONTROL SYSTEM FOR FLUID CYCLES

BACKGROUND OF THE INVENTION

1. Field of the Invention

The present invention relates to the control of liquid flow, temperatures, temperature differences, or respectively, liquid levels in refrigeration cycles, preferably in connection with screw-type compressors employing two position relay valves with electromagnetic actuation.

2. Brief Description of the Background of the Invention Including Prior Art

The known valves for two level action for liquid cycle systems, in particular for refrigerant cycle systems of compressor refrigeration plants or heating pumps are conceived as blocking valves. The essential property of such a valve is the secure closing with a high sealing effect. Expensive constructions are known for this purpose, which contain springs subject to substantial wear. The fatigue of the reset spring retards the closing procedure. Upon breakage of the spring the valve fails completely, so that the defective valve in general allows the liquid to flow through fully. The lifetime achieved by mature constructions is sufficient for the requirements in the case of resolving conventional tasks. However, these valves are unsuitable for use as two level action control elements with high switching frequencies, for example in the case of an overheating control with a two point controller. Another pilot valve for main valves is constructed for high switching frequencies with low wear construction elements. Instead of the usual reset spring a permanent magnet is employed. The valve is unsuitable for the present purposes since for completion a main valve would also be required and the required additional energy is not available as compressed air for example in the case of refrigeration plants or heat pumps. A suitable main valve is not known. The expansion of the plant with such a compressed air apparatus is economically not acceptable and not feasible.

Furthermore, the stream of refrigerating agent entering into the evaporator in a compression refrigeration installation with inside tube evaporation has to be adapted to the operating point in each case such that the refrigeration medium evaporates completely and leaves the evaporator while overheated.

In order to achieve this control object thermostatic expansion valves are employed almost exclusively. In general, proportional controllers without auxiliary are employed. The parameter to be controlled is the overheating of the refrigeration medium leaving the evaporator and is determined via the two measurement values evaporation pressure, measured at the evaporator input and output point, and the refrigeration medium temperature measured at the evaporator output, which temperature is determined with a thermal system by comparing the force at a membrane or at a corrugated pipe.

The set point of the overheating is adjusted via the pretensioning of an additional spring and the spring also acts on the membrane or the corrugated pipe, such that a deviation from set point is formed. Depending on the set point deviation, a final control element is actuated via a valve plunger of the final control element, for example a valve cone face. The flow of refrigeration medium mass entering into the evaporator is influenced such that the overheating of the refrigeration medium at the evaporator output corresponds to the set point except for the remaining control deviation. Continuously operating main valves are employed in installations of high capacity and the main valves are controlled by a thermostatic expansion valve operating as a pilot valve. However, each thermostatic control valve is only adapted to a special refrigeration agent and it does not offer possibilities for interaction with supervisory control systems.

In the case of overheating controls in refrigeration cycles with thermostatic expansion valves there are frequently stability problems which can be traced to two causes. First, the control variable "overheating" starts to oscillate without damping upon passing of the critical circuit amplification, which renders this kind of control useless. This effect appears in connection with refrigeration installations, in particular where optimized, low mass evaporators or, respectively, overdimensioned expansion valves are employed. On the other hand, the final point of the evaporation of the refrigerating agent varies locally in the evaporator. These variations occur in each evaporator. If these variations pass on up into the suction line, then the sensor receives an unstable signal, which results in the so-called "hunting" and the uselessness of the control system.

In many cases, where the critical circuit amplification occurred, in the past the time constants of the sensors were varied and the cycle amplification, which depends on the size of the valve, was varied, in order to achieve a stabilization.

Furthermore, a certain magnitude of overheating, a so-called minimum-stable signal, has to be set as a necessary condition for functioning. In order to keep this as low as possible measures have been proposed such as for example the introduction of gauze into the evaporator pipes, which are designed to reduce the size of variation of the end point of the evaporation.

These solutions proposed do not result in a stable overheating control in all application cases.

An injection valve with electrical sensor and the generation of the force providing a proper setting are disposed in a pressurized room, which room is equipped with a heating element, are taught in the German Patent Application Laid Open DE-OS No. 2,749,250. This construction is complicated and exhibits unfavorable dynamic properties.

A publication of the Singer Corporation presents a thermoelectric expansion valve with a heated sensor from semiconductor material, which changes its electrical resistance in case of transfer from overheated refrigeration agent to liquid refrigeration agent. This change in resistance is transformed into the change of the heating current through a bimetallic strip, which acts on the final control member.

In addition to unfavorable dynamic characteristic values, it is also disadvantageous in the construction in that the phase change at the location of the sensor is unsuitable as a measurement value because of the oil circulating in the refrigerating agent cycle.

A quasi steady overheating control is proposed In the Inventor's Certificate No. 389,366 of the Soviet Union, where in each case a resistance thermometer is disposed at the evaporator input and output and its measurement values are fed to a thermostat. The overheating of the refrigeration agent at the evaporator output and the control deviation are determined from theses values. An electrical interruptor continuously periodic opens and closes a solenoid valve. The thermostat acts on the interruptor such that in case there is a change of the ratio opening time to closed time of the solenoid valve the overheating of the refrigeration means at the evaporator exit is adjusted.

This solution is disadvantageous in that a solenoid valve is employed as a final control member. In case of extremely high switching frequencies the durability and lifetime of such valves are insufficient. The interruptor puts the technical requirements of the construction at a high value. It is not assured that in case of a defect in the control system the final control member will pass into the closed position, which is indispensable for the safety of the plant.

In the case of large capacities electronically controlled motor adjusting valves are also employed. These are controlled by the temperature difference between the evaporator input and evaporator output section. The measurement of the temperature difference is generally performed with resistance thermometers. The expense of the controllers prevent their use in smaller and medium sized units.

SUMMARY OF THE INVENTION

1. Purposes of the Invention

It is an object of the present invention to provide a simple relay control valve system with two level control in order to provide for a high switching frequency without fatigue problems or failure of the valve system.

It is another object of the invention to provide a relay control valve with a minimum number of components and assembly without technical problems when the sealing effectiveness is of lesser concern.

It is a further object of the present invention to provide a control apparatus and method for controlling the temperatures, temperature differences and liquid levels at refrigeration installations or, respectively, heat pumps, which can be used independently from the refrigerating agent employed and from the application field of operation.

It is another object of the invention to provide a control of temperatures, temperature differences or, respectively, liquid levels in refrigeration cycles, which avoids the instabilities of a conventional refrigeration cycle.

It is an additional object of the invention to provide a construction of a refrigeration cycle where the variations of the evaporation end point do not exert a substantial influence on the functioning of the control system.

These and other objects and advantages of the present invention will become evident from the description which follows.

2. Brief Description of the Invention

The present invention provides an apparatus for the control of temperatures, temperature differences or, respectively, liquid levels in fluid cycle systems, which comprises a low wear two position valve including a valve body, a permanent magnet disposed below the valve body, an electromagnet disposed above the valve body, a horizontal liquid channel running through the valve body, a vertical control bore disposed in the valve body and communicating with the horizontal liquid channel, a control piston guided in the vertical control bore, a vertical working bore disposed in the valve body and communicating with the horizontal liquid channel, a working piston having a throttling position and disposed in the vertical working bore, a first control channel disposed above the horizontal liquid channel connecting the vertical control bore to the vertical working bore, a second control channel disposed above the horizontal liquid channel connecting the vertical control bore to the vertical working bore, a first bushing extending the vertical control bore into the electromagnet, a second bushing extending the vertical control bore into the permanent magnet, a connection channel joining the output side of the horizontal liquid channel, a first intermediate channel connecting the upper part of the vertical control bore to the connection channel, a second intermediate channel connecting the lower part of the vertical control bore to the connection channel.

A stop pin is preferably disposed at an end of the working bore. The magnetic force of the electromagnet is preferably larger than the magnetic force of the permanent magnet; and the control channels, the intermediate channels and the connection channel run in a horizontal direction. Protrusions can be disposed at the control piston for alternatingly closing the control channels.

There can further be provided a controller forming a plural position correcting variable depending on the deviation from the set point, devices with temperature dependent electrical properties providing sensors connected to the controller and connected to the low wear two position valve, and a reference point source for providing an adjustable reference point to the controller. Preferably, the frequency of switching actuation is from about 0.1 second to 60 seconds. Devices with temperature dependent breakdown voltages can be employed as devices with temperature dependent electrical properties. Elements with temperature dependent resistors can be employed as devices with temperature dependent electrical properties. In the case of multipoint controls a plurality of two position valves can be employed in parallel in the control circuit.

According to another aspect of the invention there is provided an apparatus for the control of temperatures, temperature differences or, respectively, liquid levels in refrigeration cycles, which comprises a controller forming a plural position correcting variable depending on the deviation from the set point, devices with temperature dependent electrical properties providing sensors connected to the controller, a reference point source for providing an adjustable reference point to the controller, and low wear two position valves having a high frequency of switching actuation, providing final control members and connected to the controller.

The frequency of switching actuation can be from about 0.1 second to 60 seconds and is preferably between 1 and 10 seconds. Devices with temperature dependent breakdown voltages can be employed as devices with temperature dependent electrical properties. Elements with temperature dependent resistors can be employed as devices with temperature dependent electrical properties. Temperature differences can be sensed via differences in breakdown voltages of semiconductor elements. The liquid levels can be sensed with elements providing voltage drops as input signals for the controller. In the case of multipoint controls a plurality of two position valves can be employed in parallel in the control circuit. Semiconductor diodes can be employed as sensors for the control of temperatures. Sensors with opto-electronic devices can be employed as sensors for the liquid level control. The mass of the sensors can be so low that no substantial delay times occur between the state of the variable measured and the value measured at the p-n junction.

The control system can be laid out such that the sensors and switching times are surveyed for assuring the intrinsic safety of the apparatus. The set point adjustment can be performed for limiting the temperatures of the refrigerating agent. A set point adjustment can be performed to limit the refrigerating agent temperature at the compressor output and/or to limit the evaporation temperature.

There is also provided a method for the control of temperatures, temperature differences or, respectively, liquid levels in fluid cycle systems which comprises feeding a fluid into a valve body through a horizontal bore in the valve body, retaining a control piston disposed in a bore cavity of the valve body at the bottom of the bore cavity with a permanent magnet for closing a liquid feed to a working piston such that the working piston closes the flow of fluid through the valve body, energizing an electromagnet disposed on top of the valve body and adapted to engage the control piston for moving the control piston so as to open said liquid feed to the working piston such that the working piston opens the flow of fluid through the valve body, and removing the fluid from the area of the control bore cavity disposed next to the electromagnet.

Further features of the method can include deenergizing the electromagnet disposed on top of the valve body and adapted to disengage the control piston allowing the control piston to be attracted by the permanent magnet so as to close said liquid feed to the working piston such that the working piston closes the flow of fluid through the valve body, and removing the fluid from the area of the control bore cavity disposed next to the permanent magnet. Preferably, the electromagnet is switched at a rate of from about 0.1 to 30 seconds. A two position correcting variable can be formed and provided depending on the deviation from a set point, employing a sensing circuit as a measuring member where the sensors are devices with temperature dependent electrical properties, setting the set point according to a reference point, and switching the electromagnet depending on the signal from the sensing circuit. Breakdown voltages of semiconductor diodes can be employed as sensor variables.

There is also provided a method for the control of temperatures, temperature differences or, respectively, liquid levels in refrigeration cycles which comprises forming a two position correcting variable depending on the deviation from set point, employing a sensing circuit as a measuring member where the sensors are devices with temperature dependent electrical properties, setting the set point according to a reference point, switching the final control elements provided as low wear two position valves at a rate of from about 0.1 to 30 seconds.

Breakdown voltages of semiconductor diodes can be employed as sensor variables. Delay times between the actual value and the sensed value of the parameter sensed can be avoided by employing sufficiently low mass sensing elements. The sensor and the switching times of the control apparatus can be surveyed for assuring the intrinsic safety of the apparatus. The set point for limiting the temperatures of the refrigerating agent can be adjusted at a desired location in the cycle. The liquid level can be determined with an opto-electronic sensor.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

In accordance with the invention a valve body is disposed between a permanent magnet and an electromagnet. Here the electromagnet is provided for the generation of stronger fields compared with the permanent magnet. The valve body casing comprises a horizontal channel for liquid through which the medium is transported. In addition the valve body is provided with a first vertical bore running through the liquid channel, into which bore is led a control piston with two protrusions. A second vertical bore also running through the liquid channel receives a work piston. These two bores are in each case connected with a control channel disposed above and below the liquid channel. The control piston is guided by way of guide bushings in the bore coordinated to it on the one hand at the upper side in the electromagnet and on the other hand at the bottom side in the permanent magnet. Stop pins are disposed at the ends of the bore receiving the working piston.

A connection channel running above and below the control channels starts in each case at the bore of the control piston and runs into a connection channel disposed at the same level of the liquid channel, which connection channel joins into the liquid channel on the output side or, respectively, on the low pressure side of the valve body. The protrusions at the control piston are provided with the same distance as the distance of the two control channels such that the protrusions alternatingly close the control channels. Between the guide bushings and the valve body casing as well as between the detent pin and the valve body are disposed lines, which comprise a liquid resistant structural material.

Figure 1:
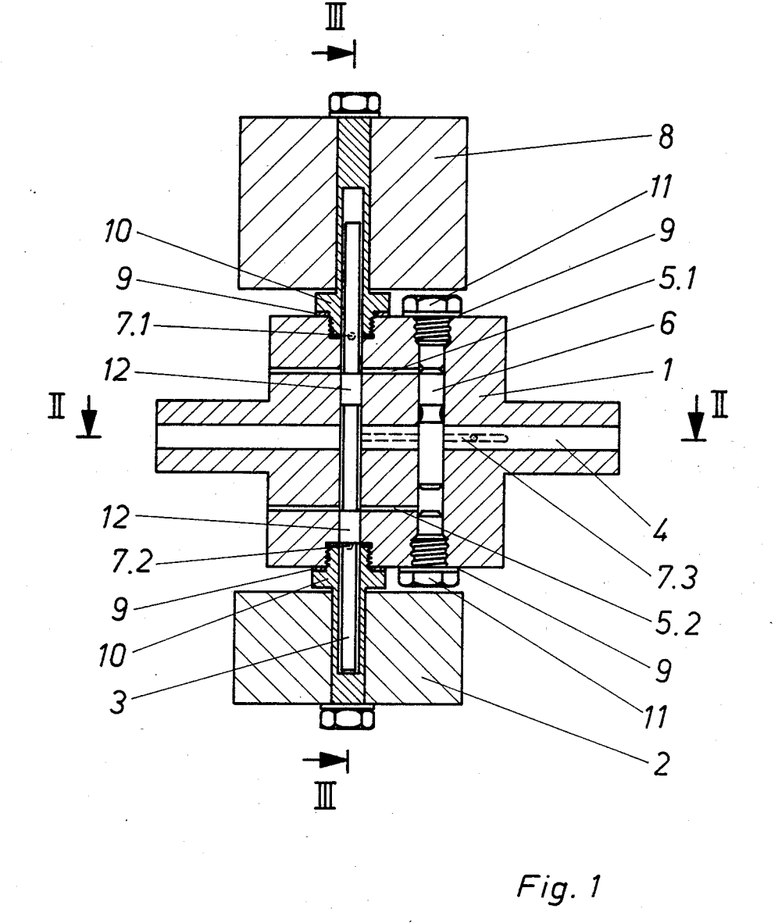
FIG. 1 is a schematic sectional view of the relay control valve system part of the apparatus.
Figure 2:
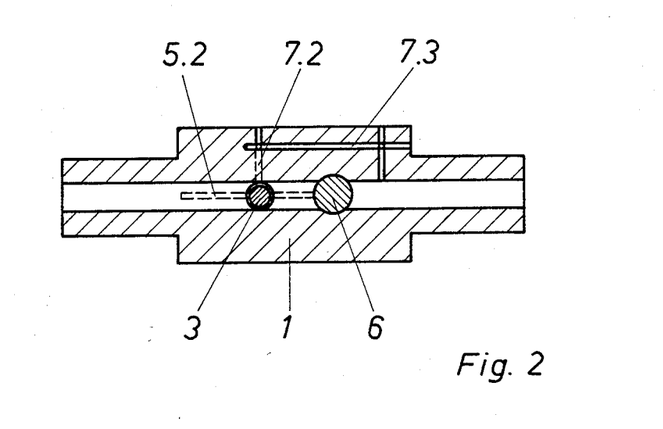
FIG. 2 is a schematic sectional view of the relay control valve along section line II—II of FIG. 1.
Figure 3:
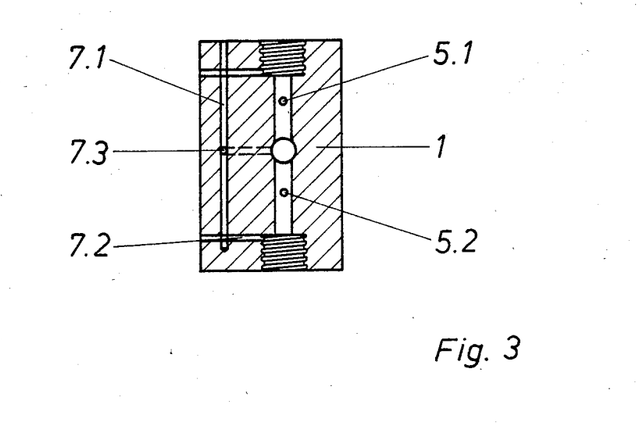
FIG. 3 is a schematic sectional view of the relay control valve along section line III—III of FIG. 1.

The relay control valve system is of the two level action type with an electrically actuated pilot valve provision. A valve body 1 comprising a horizontal liquid channel 4 is disposed between a permanent magnet 2 and a higher power electromagnet 8. The valve body 1 comprises a vertical bore passing through the liquid channel 4 for guiding a control piston 3 and a further vertical bore also passing through the liquid channel 4 for guiding a working piston with a throttle position 6. Control channels 5.1, 5.2 disposed above and, respectively, below the liquid channel 4 connect the two bores. The control piston 3 is led via bushings 10 into the magnets 2, 8. The stop pins 11 are disposed at the two ends of the bore containing the working piston 6. An intermediate channel 7.1, 7.2 running above and, respectively, below the control channels 5.1, 5.2 is connected from the bore of the control piston 3 to a horizontal connection channel 7.3 running at the same level as the horizontal liquid channel 4. The connection channel is connected to the liquid channel 4 on the output side of the valve. The control channel 3 can comprise protrusions 12 alternatingly closing the control channels 5.1, 5.2.

In order to reach the closure position the permanent magnet 2 pushes the control piston 3 into the lower position shown in FIG. 1. The lower protrusion 12 of the control piston 3 opens the access to the control channel 5.2, while the upper protrusion 12 blocks the access to the control channel 5.1 Thereby the condensation pressure applied to the refrigerant channel 4 of the case 1 acts from below on the work piston of the throttling position via the control channel 5.2. The work piston 6 is placed into locking position and thereby also presses against the detent pin 11. The pressure above the work piston is maintained via the control piston 3, at the control channel 5.1 and the connection channel 7.1 and 7.2 and it is reduced on the low pressure side to the refrigerant channel 4. In order to open the set control valve an electrical voltage is applied to the electromagnet 8. The electromagnet 8 effects a larger force on the control piston 3 as compared with the permanent magnet 2. The force difference moves the control piston 3 through the bushing 10 into the upper position. At the same time the upper protrusion 12 of the control piston 3 opens the access to the control channel 5.1, while the lower protrusion 12 closes the access to the control channel 5.2. Now the condensation pressure of the refrigerant channel 4 acts on the upper side of the work piston 6 via the control channel 5.1 and moves the same into open position. The pressure on the counterside of the work piston is reduced via the bore receiving the control piston 3, the control channel 5.2 and the connection channel 7.2 and 7.3 to the low pressure side. The seals 9, made of a refrigerant stable material assure a sealing between the valve body casing 1 and the bushings 10 and the stop pin 11.

In case of a failure the valve is closed via the permanent magnet. Springs are not required. The speed requirements are not very high since a high requirement is imposed on the sealing stability. The oil present in the refrigerant circle assures a sufficient supply of the sliding surfaces. The construction assures a long lifetime of the valve.

Figure 4:
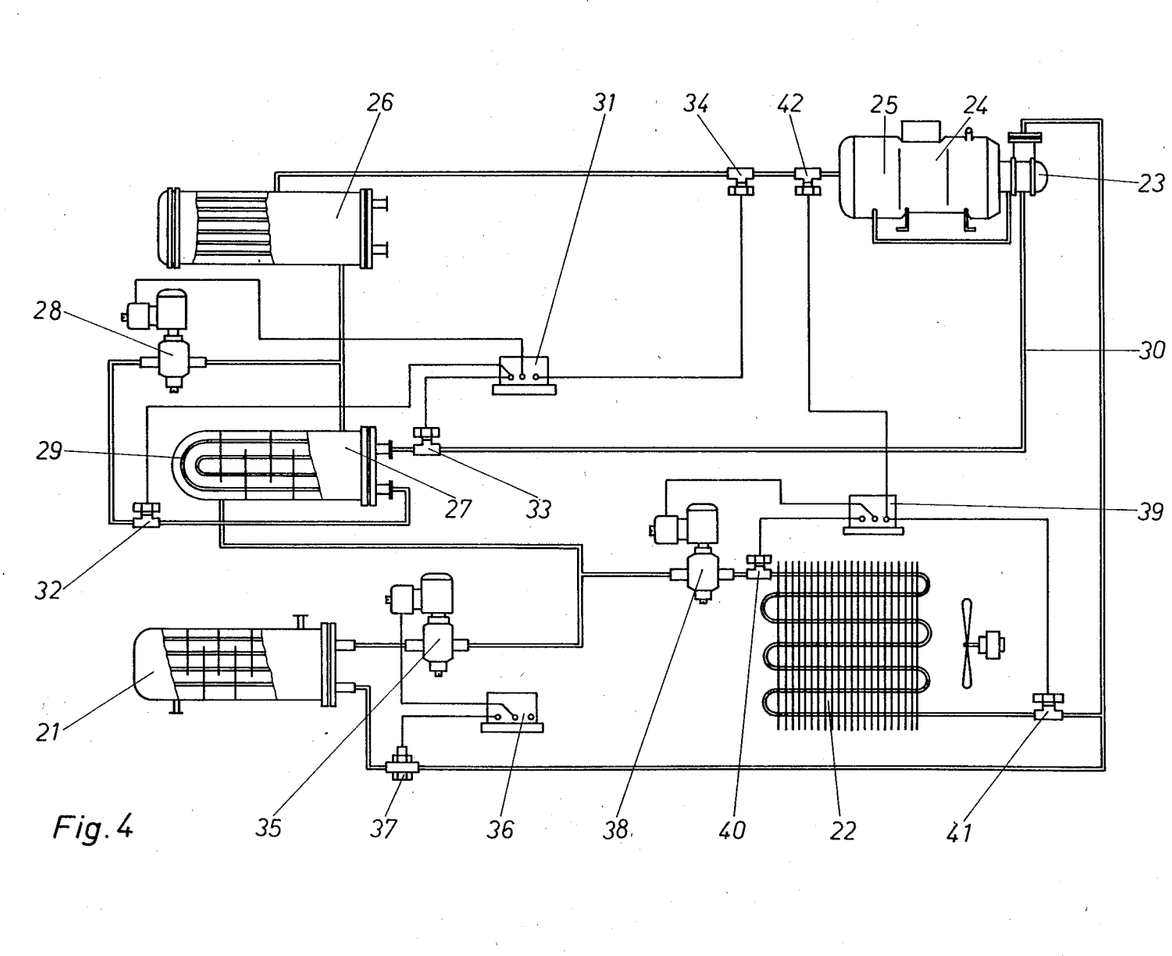
FIG. 4 is a schematic view of a diagram showing a refrigeration cycle where the temperature, the temperature difference and the liquid level are controlled by relay control valves.

There is also provided a control of temperatures, temperature differences or, respectively, filling levels in refrigeration cycles and preferably in cooling agent evaporators of heat pumps and refrigeration installations. The controllers 31, 36, 39 form a two point or plural point correction variable depending on the deviation from the control deviation. The measurement member comprises a measurement circuit such that the sensors are devices with temperature dependent breakdown voltages or devices with temperature dependent resistances where these breakdown voltages are input signals of the controller in case of absolute control variables, breakdown voltage differences are input signals of the controller in case of the control of differences, and voltage drops are the input signals to the controller in case of liquid level measurements. The set point can be adjusted with a set point source and the final control elements 28, 35, 38 can be controlled low wear on-off position valves with high switching frequency and with a period in the range of seconds.

Several two point position valves can be disposed in parallel to each other in the control circuit. Semiconductor diodes can be employed for the temperature and/or temperature difference control as sensors. Optoelectronic devices can be used as sensors to determine the liquid level. The mass of the sensors can be selected so low that between the p-n transition and the measurement valve no substantial delay times are interposed. The intrinsic safety of the apparatus can be assured by surveying the sensors and the switching times with the control apparatus 31, 36, 39. A possibility can be provided for set point adjustment to limit the refrigerant temperatures such as for example the cooling agent temperature at the compressor output point or the evaporating temperature.

The measurement member comprises a measurement circuit, where the measurement sensors are devices with temperature dependent breakdown voltages, where the input signals of the controller are the breakdown voltages in the case of absolute control variables and the break down voltage differences in the case of differences of control variables. The set point can be adjusted from the outside or can be guided. Semiconductor diodes are employed as sensors in case of temperature or temperature difference control, where the temperature dependent breakdown voltage is employed. The construction of the sensor is such that due to low masses no substantial delay times arise between the p-n transition and the actual test value. The delay times are preferably less then one minute and more preferably less than one second.

In the case of liquid level determinations a sensor is employed which uses the light dependent resistance of opto-electronic devices. The photo-resistor is applied at the side of a double viewing glass. A light emitting diode for example is installed on the opposite side as a light source. If there is a transition of refrigeration agent vapor into refrigeration agent liquid the light transmission is changed and a signal for control purposes is produced.

If the light transmission is constant, then a simple float in the viewing glass, which is lifted up and lowered with the level of the liquid, provides the desired effect. Electromagnetically actuated on-off position valves with pistons, adapted for high switching frequencies are installed in the control provision as final control elements instead of the hitherto employed thermostatic expansion valves.

Several on-off position valves can be used in parallel for realizing plural point controls. If a breakdown occurs in the control circuit such that the control circuit does not emit any switching pulses, then a signal is provided via a time actuated relay, which can be employed to note the failure and which can be used to shut off the installation.

According to a preferred embodiment the refrigerating agent is evaporated in the evaporators 21 and 22, is sucked up by the screw-type compressor 23, which is driven by the semi-hermetically sealed motor 24, and is compressed. Oil can be injected directly back into the screw-type compressor in order to improve sealing. The oil refrigerant mixture passes into the oil trap 25 and is separated substantially into refrigerant vapor and oil. The separated oil can be fed back directly into the screw-type compressor without being cooled in an oil cooler.

The refrigerant vapor flows into the liquefier 26, releases its overheating and condensation enthalpy and runs as a liquid into the collector 27. A small partial stream is injected into the cooling snake 29 via the two position valve 28, where it refrigerates the liquid cooling agent disposed in the collector 27. The refrigerant evaporated in the cooling snake 29 passes via line 30 into the charging bore of the screw-type compressor 23. At the same time the inner cooling of the compressor 23 and of the motor 24 are effected via the temperature controller 31, which controls the overheating of the refrigerant vapor in the line 30 by setting of the on-off position valve 28 according to the sensors 32 and 33 by adjusting the set point of the overheating by the control parameter of the compressed gas temperature via the sensor 34. The object of the intermediate cooling can also be achieved by a so-called intermediate pressure cylinder, where the filling grade is controlled by a level controller.

The heavily undercooled refrigerant passes from the collector 27 via the two position valve 35, controlled according to the filling level controller 36 with the optoelectronic sensor 37, into the evaporator 21 or, respectively, via the two position valve 38, controlled by the temperature controller 39 with the sensors 40, 41, and 42 into the evaporator 22.

The filling level controller 36 controls directly the filling level in the evaporator 21 by having disposed at the exit of the evaporator 21 a viewing glass furnished with light emitting diode and photoelectric resistor. If the evaporation end product, the gas-fog mixture, reaches the sensor location 37, then the light of the diode is damped and a change occurs in the photoresistance, which causes the liquid level controller 37 to close the on-off position valve 35. Thereby the evaporation end point is moved back into the evaporator 21, whereby transparent vapor is present at the opto-electronic sensor 37. The on-off position valve is put in open position again.

The control of the evaporator 22 is provided analogously to that of the cooler snake 29 with the temperature controller 31.

An inner cooling of the screw-type compressor 23 can also be achieved by a controlled overflowing of the evaporator 22 by changing the set point of the overheating, depending on the temperature of the compressed gas after the oil trap 25 as measured with the sensor 42. The objective of internal cooling is taken alternatively by one of the two temperature controllers 31 or 39.

The particular advantage of the present control provision comprises the double functioning of refrigerant injection into the evaporator or, respectively, economizer and the simultaneous cooling of the compressor and motor, which saves the need for a separate outer oil cooler or, respectively, an additional control valve for the injection of cooling agent into the suction line.

The two position valves can be employed for all refrigeration agents, including refrigerant mixtures which are not azeotropic mixtures. They are characterized by a simple construction and there is no limitation as to the temperature range.

Surprisingly it was found that a periodic injection of refrigerant into the evaporator with a period of about 3 seconds does not exert a negative influence on the operating parameters of the installation. The variations of the end point of the evaporation of the refrigerant do not interfere with the control of the overheating, so that the undamped oscillating of the control variable overheating can be avoided.

The variations of the overheating at the evaporator output are less than one degree Kelvin. The control circuit operates under stable conditions at any rate.

It will be understood that each of the elements described above, or two or more together, may also find a useful application in other types of refrigeration or heat pump system configurations and fluid processing procedures differing from the types described above.

While the invention has been illustrated and described as embodied in the context of an apparatus and a method for the control of fluid flow, temperatures, temperature differences or, respectively, filling levels in fluid cycle systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for the control of fluid flow, temperatures, temperature differences or, respectively, liquid levels in fluid cycle systems comprising a low wear two position valve including a valve body;

a permanent magnet disposed below the valve body;

an electromagnet disposed above the valve body;

a horizontal liquid channel running through the valve body;

a vertical control bore disposed in the valve body and communicating with the horizontal liquid channel;

a control piston guided in the vertical control bore;

a vertical working bore disposed in the valve body and communicating with the horizontal liquid channel;

a working piston having a throttling position and disposed in the vertical working bore;

a first control channel disposed above the horizontal liquid channel connecting the vertical control bore to the vertical working bore;

a second control channel connecting the vertical control bore to the vertical working bore;

a first bushing extending the vertical control bore into the electromagnet;

a second bushing extending the vertical control bore into the permanent magnet;

a connection channel joining the output side of the horizontal liquid channel;

a first intermediate channel connecting the upper part of the vertical control bore to the connection channel;

a second intermediate channel connecting the lower part of the vertical control bore to the connection channel;

a controller forming a plural position correcting variable depending on the deviation from the set point;

devices with temperature dependent electrical properties providing sensors connected to the controller and connected to the low wear two position valve; and a reference point source for providing an adjustable reference point to the controller.

2. The apparatus for control in fluid cycle systems according to claim 1 further comprising
a stop pin disposed at an end of the working bore.

3. The apparatus for control in fluid cycle systems according to claim 1 wherein the magnetic force of the electromagnet is larger than the magnetic force of the permanent magnet and wherein the control channels, the intermediate channels and the connection channel are running in a horizontal direction.

4. The apparatus for control in fluid cycle systems according to claim 1 further comprising protrusions disposed at the control piston for alternatingly closing the control channels.

5. The apparatus for control in fluid cycle systems according to claim 1 wherein the frequency of switching actuation is from about 0.1 second to 60 seconds.

6. The apparatus for control in fluid cycle systems according to claim 1 wherein devices with temperature dependent breakdown voltages are employed as devices with temperature dependent electrical properties.

7. The apparatus for control in fluid cycle systems according to claim 1 where in the case of multipoint controls a plurality of two position valves are employed in parallel in the control circuit.

8. An apparatus for the control of temperatures, temperature differences or, respectively, liquid levels in refrigeration cycles comprising
a controller forming a plural position correcting variable depending on the deviation from the set point;
devices with temperature dependent electrical properties providing sensors connected to the controller;
a reference point source for providing an adjustable reference point to the controller; and
low wear two position valves having a high frequency of switching actuation, providing final control members and connected to the controller and each two position valve including
a valve body;
a first magnet disposed below the valve body;
a second magnet disposed above the valve body;
a liquid channel running through the valve body;
a control bore disposed in the valve body and communicating with the liquid channel;
a control piston guided in the vertical control bore;
a working bore disposed in the valve body and communicating with the liquid channel;
a working piston having a throttling position and disposed in the working bore;
a first control channel disposed above the liquid channel connecting the control bore to the working bore;
a second control channel connecting the control bore to the working bore;
a first bushing extending the control bore into the second magnet;
a second bushing extending the control bore into the first magnet;
a connection channel joining the output side of the liquid channel;
a first intermediate channel connecting the upper part of the control bore to the connection channel;
a second intermediate channel connecting the lower part of the control bore to the connection channel.

9. The apparatus for the control of temperatures, temperature differences or, respectively, liquid levels in refrigeration cycles according to claim 8 wherein the frequency of switching actuation is from about 0.1 second to 60 seconds.

10. The apparatus for the control of temperatures, temperature differences or, respectively, liquid levels in refrigeration cycles according to claim 8 wherein devices with temperature dependent breakdown voltages are employed as devices with temperature dependent electrical properties.

11. The apparatus for the control of temperatures, temperature differences or, respectively, liquid levels in refrigeration cycles according to claim 8 wherein elements with temperature dependent resistors are employed as devices with temperature dependent electrical properties.

12. The apparatus for the control of temperatures, temperature differences or, respectively, liquid levels in refrigeration cycles according to claim 8 wherein temperature differences are sensed via differences in breakdown voltages of semiconductor elements.

13. The apparatus for the control of temperatures, temperature differences or, respectively, liquid levels in refrigeration cycles according to claim 8 wherein liquid levels are sensed with elements providing voltage drops as input signals for the controller.

14. The apparatus for the control of temperatures, temperature differences or, respectively, liquid levels in refrigeration cycles according to claim 8 where in the case of multipoint controls a plurality of two position valves are employed in parallel in the control circuit.

15. The apparatus for the control of temperatures, temperature differences or, respectively, liquid levels in refrigeration cycles according to claim 8 wherein semiconductor diodes are employed as sensors for the control of temperatures.

16. The apparatus for the control of temperatures, temperature differences or, respectively, liquid levels in refrigeration cycles according to claim 8 wherein sensors with opto-electronic devices are employed as sensors for the liquid level control.

17. The apparatus for the control of temperatures, temperature differences or, respectively, liquid levels in refrigeration cycles according to claim 16 wherein the mass of the sensors is so low that no substantial delay times occur between the state of the variable measured and the value measured at a p-n junction.

18. The apparatus for the control of temperatures, temperature differences or, respectively, liquid levels in refrigeration cycles according to claim 8 wherein the control system is laid out such that the sensors and switching times are monitored with a controller for assuring the intrinsic safety of the apparatus.

19. The apparatus for the control of temperatures, temperature differences or, respectively, liquid levels in refrigeration cycles according to claim 8 wherein the set point adjustment is performed for limiting the temperatures of the refrigerating agent.

20. The apparatus for the control of temperatures, temperature differences or, respectively, liquid levels in refrigeration cycles according to claim 19 wherein the set point adjustment is performed to limit the refrigerating agent temperature at the compressor output.

21. The apparatus for the control of temperatures, temperature differences or, respectively, liquid levels in refrigeration cycles according to claim 19 wherein the set point adjustment is performed to limit the evaporation temperature.

22. A method for the control of temperatures, temperature differences or, respectively, liquid levels in fluid cycle systems comprising
   feeding a fluid into a valve body through a horizontal bore in the valve body;
   retaining a control piston disposed in a bore cavity of the valve body at the bottom of the bore cavity with a permanent magnet for closing a liquid feed to a working piston such that the working piston closes the flow of fluid through the valve body;
   energizing an electromagnet disposed on top of the valve body and adapted to engage the control piston for moving the control piston such as to open said liquid feed to the working piston such that the working piston opens the flow of fluid through the valve body; and
   removing the fluid from the area of the control bore cavity disposed next to the electromagnet;
   forming a two position correcting variable depending on the deviation from a set point;
   employing a sensing circuit as a measuring member where the sensors are devices with temperature dependent electrical properties;
   setting the set point according to a reference point;
   switching the electromagnet depending on the signal from the sensing circuit.

23. The method for control of fluid cycle systems according to claim 22 further comprising
   deenergizing the electromagnet disposed on top of the valve body and adapted to disengage the control piston to be attracted by the permanent magnet so as to close said liquid feed to the working piston such that the working piston closes the flow of fluid through the valve body; and
   removing the fluid from the area of the control bore cavity disposed next to the permanent magnet.

24. The method for control of fluid cycle systems according to claim 22 wherein the electromagnet is switched at a rate of from about 0.1 to 30 seconds.

25. The method for the control of fluid cycle systems according to claim 22 wherein breakdown voltages of semiconductor diodes are employed as sensor variables.

26. A method for the control of temperatures, temperature differences or, respectively, liquid levels in refrigeration cycles comprising
   feeding a fluid into a valve body through a bore in the valve body;
   retaining a control piston disposed in a bore cavity of the valve body at the bottom of the bore cavity with a permanent magnet for closing a liquid feed to a working piston such that the working piston closes the flow of fluid through the valve body;
   energizing an electromagnet disposed on top of the valve body and adapted to engage the control piston for moving the control piston such as to open said liquid feed to the working piston such that the working piston opens the flow of fluid through the valve body; removing the fluid from the area of the control bore cavity disposed next to the electromagnet;
   forming a two position correcting variable depending on the deviation from set point;
   employing a sensing circuit as a measuring member where the sensors are devices with temperature dependent electrical properties;
   setting the set point according to a reference point;
   switching the valve at a rate of from about 0.1 to 30 seconds.

27. The method for the control of temperatures, temperature differences or, respectively, liquid levels in refrigeration cycles according to claim 26 wherein breakdown voltages of semiconductor diodes are employed as sensor variables.

28. The method for the control of temperatures, temperature differences or, respectively, liquid levels in refrigeration cycles according to claim 26 further comprising
   avoiding delay times between the actual value and the sensed value of the parameter sensed by employing sufficiently low mass sensing elements.

29. The method for the control of temperatures, temperature differences or, respectively, liquid levels in refrigeration cycles according to claim 26 further comprising
   surveying the sensor and the switching times of the control apparatus for assuring the intrinsic safety of the apparatus.

30. The method for the control of temperatures, temperature differences or, respectively, liquid levels in refrigeration cycles according to claim 26 further comprising
   adjusting the set point for limiting the temperatures of the refrigerating agent at a desired location in the cycle.

31. The method for the control of temperatures, temperature differences or, respectively, liquid levels in refrigeration cycles according to claim 26 further comprising
   determining the liquid level with an opto-electronic sensor.

* * * * *